United States Patent [19]

Baker et al.

[11] 4,434,421

[45] Feb. 28, 1984

[54] METHOD FOR DIGITAL DATA TRANSMISSION WITH BIT-ECHOED ARBITRATION

[75] Inventors: Lewin T. Baker; Sanjay K. Bose, both of Schenectady, N.Y.; Paul G. Huber, West Warwick, R.I.

[73] Assignee: General Electric Company, Schenectady, N.Y.

[21] Appl. No.: 322,495

[22] Filed: Nov. 18, 1981

[51] Int. Cl.$^3$ .............................................. H04Q 3/00
[52] U.S. Cl. .................................. 340/825.51; 370/85
[58] Field of Search ........... 340/825.51, 825.5, 825.05, 340/825.77; 371/6, 61; 178/3; 370/85, 89, 95

[56] References Cited

U.S. PATENT DOCUMENTS

| 3,997,872 | 12/1976 | Cane et al. | 340/825.5 |
| 4,106,104 | 8/1978 | Nitta et al. | 340/825.5 |
| 4,229,792 | 10/1980 | Jensen et al. | 371/61 |
| 4,320,467 | 3/1982 | Glass | 340/825.5 |

OTHER PUBLICATIONS

"Partial Demand-Response Interlock", R. P. Jewett et al., IBM Tech. Disclosure Bulletin, vol. 20, No. 1, Jun. 1977, pp. 302-303.

Primary Examiner—Donald J. Yusko
Attorney, Agent, or Firm—Geoffrey H. Krauss; James C. Davis, Jr.; Marvin Snyder

[57] ABSTRACT

In a digital data communications system having a plurality of slaved data transceivers transmitting data to, and receiving data from, a master station, the master station classifies a received signal, in each of a multiplicity of bit time intervals, as one or the other of the pair of binary signal states. The received binary signal state is echoed to all of the slaved stations, to cause those stations which did not previously transmit that binary state to cease transmitting data. Those slave stations which transmitted the echoed previous bit binary state then transmit the next bit of data, which is again echoed. Slaved stations receiving bit echoes which are different from the previous bit sent will know that there has been a collision and that the master station did not receive their bit of data, whereby the number of slave stations transmitting is reduced, in successive bit time intervals, until only one slave station remains transmitting. The initial portion of the message of the one remaining station need not be repeated, whereby system time is not lost.

16 Claims, 3 Drawing Figures

METHOD FOR DIGITAL DATA TRANSMISSION WITH BIT-ECHOED ARBITRATION

BACKGROUND OF THE INVENTION

The present invention relates to digital data communication systems and, more particularly, to a novel method for arbitration of collisions in such systems.

It is well known to use bit arbitration to resolve priority conflicts in data transmission systems where several remote, or slave, stations tend to simultaneously transmit a message to a master station. In many data transmission systems where noise and attenuation exist on the transmission medium, contention among communication units is generally resolved by restricting transmission to a single station which is specifically designated by polling and the like techniques. In the event that specific-designation techniques are not used, collisions between transmissions from a plurality of remote-slave stations would normally occur and all of the contending stations would cease transmission before making a second attempt, usually after a random delay, to transmit the message without collision. It will be seen that such techniques reduce the system data rate, as a particular station must either hold its data until polled or must repeat its transmission several times until the message is completely transmitted without collision. It is highly desirable to provide a method for digital data transmission, in a system in which collisions may occur, in such manner that system time is not lost and not even a portion of a message from a successfully-contending remote station need be repeated.

BRIEF SUMMARY OF THE INVENTION

In accordance with the invention, in a digital data communication system having a master station and a plurality of remote-slaved stations, each capable of transmitting data and each continuously receiving data transmitted on a common media, the master station transmits an echo of that one of the pair of binary data states detected during each of a sequential plurality of bit time intervals. If a plurality of remote stations are transmitting during the initial portion of a particular bit time interval, only those remote stations receiving the echoed bit value previously sent continue to transmit another bit of information during the next time interval. All remote stations receiving the opposite echoed bit condition cease transmitting. After some number of bit time intervals, only a single remote station is left, which has previously transmitted all of the binary bits echoed by the master station, and which remote station continues to transmit the remainder of its message, until that message is complete, without requiring retransmission of the initial data bits thereof. A message initiated by the master station includes source-identifying flag bits.

In one embodiment, the master-station-originated message bits are each transmitted during the initial portion of an associated bit time interval, while in another embodiment the master-station-originated message bits are transmitted in the response portion of the bit time interval, whereby the master station does not echo its own transmissions in either case. Remote-slaved stations which commence simultaneous transmission with the master station will then either immediately or eventially cease transmission as a data bit is not echoed back.

Accordingly, it is an object of the present invention to provide a novel method for transmitting binary digital data over a common media with bit-echoed arbitration for resolution of collisions.

This and other objects of the present invention will become apparent upon consideration of the following detailed description, when read in conjunction with the drawings.

DETAILED DESCRIPTION OF THE INVENTION

Figure 1:
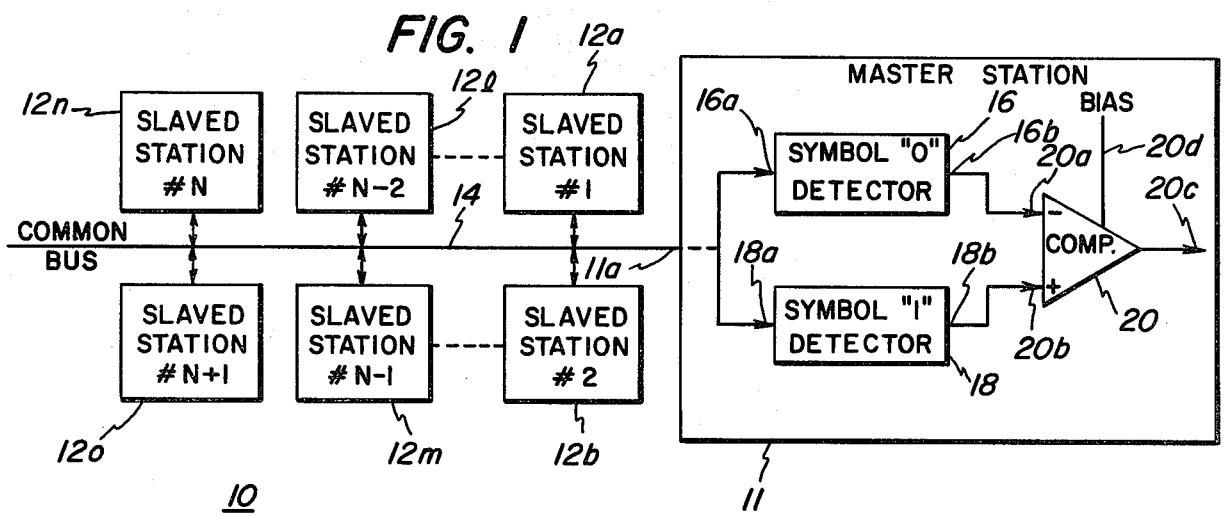
FIG. 1 is a schematic block diagram of a system utilizing the method of the present invention.
Figure 2:
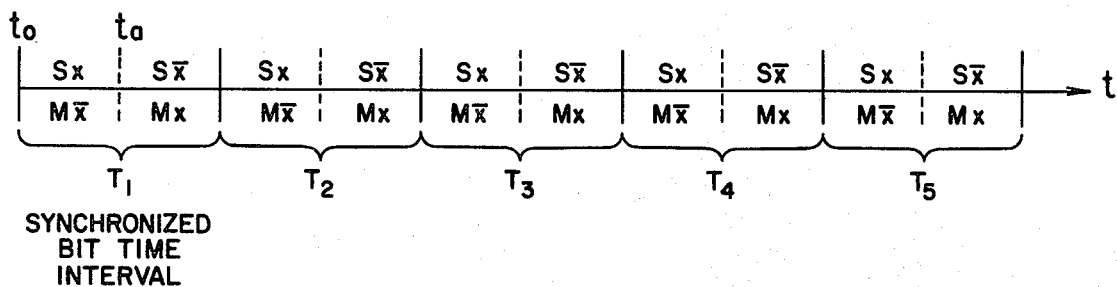
FIG. 2 is a graph illustrating the bit time intervals and portions thereof during which either the master station or the slave stations are active, and is useful in understanding the principles of the present invention.

Referring initially to FIGS. 1 and 2, a data transmission system 10 utilizes a master station 11 and a plurality of remote, slaved stations 12a–12o, all connected together by means of a data transmission medium 14, e.g. a coaxial cable, a twisted wire pair, an optical fiber and the like. Each of master station 11 and slaved stations 12 is adapted to continuously receive data transmissions from common bus 14. Each of stations 11 and 12 is provided with a transmission capability. Thus, all stations, master or slave, continuously listen to the data flowing on the bus, and may transmit, under the restrictions of our novel method as hereinbelow further described.

Master station 11 includes a means 16 of detecting a first binary data state, e.g. a symbol "0" detector, and also includes another means 18 for detecting the remaining binary data state, e.g. a symbol "1" detector. The respective inputs 16a and 18a of the binary 0 detector means and the binary 1 detector means are connected in parallel to the common bus input port 11a of the master station. Detector means 16 and 18 may be any of the binary state detection means known to the art and compatible with the type of data communications technique selected for communication along bus 14. Thus, if the binary data is transmitted by a frequency-shift-keyed carrier, detector means 16 and 18 may be a pair of filters matched to the binary 0 and binary 1 carrier-shifted frequencies. The respective detector outputs 16b and 18b are each respectively connected to an associated one of the differential inputs 20a and 20b, respectively, of a comparator means 20. The comparator output 20c provides a binary signal indicating which one of the binary conditions is then being received by master station 11.

System 10 operates in synchronized fashion, with the synchronizing signal being obtained in known manner. For example, if common bus 14 is a power line, wherein data is transmitted by powerline carrier techniques, the zero crossings of the powerline waveform may be utilized as the synchronizing signal, with successive zero crossings signaling the beginning of each of a plurality of successive synchronized bit time intervals T. Each bit time interval T, e.g. first bit time interval $T_1$ (FIG. 2), is divided into initial and response portions. During the initial bit time interval portion, e.g. from time $t_0$ to time $t_a$, a slaved station 12 may, in the master-station listening condition, transmit a bit of information, as signified by the Sx symbol. During this intial portion the master station receives and does not transmit, as indicated by the $\overline{Mx}$ symbol. In the response portion of each bit time interval, e.g. from time $t_a$ to the end of bit time interval $T_1$, the slaved stations ae enabled only to receive, and are disabled from transmitting, as indicated by the $\overline{Sx}$ symbol; the master station is enabled to transmit, as indicated by the Mx symbol, and transmits back, the symbol at output 20c during the immediately-previous initial portion of that bit time interval. Thus, in a system with a master station and many slave stations which can initiate messages, the contentions produced when several slave stations commence transmitting messages simultaneously is resolved by having the master station transmit an echo which is the previously-received data bit, on a bit-by-bit basis. Although the composite signal received at master station input 11a may not be resolvable into either a binary 0 or a binary 1 signal when many slave stations simultaneously transmit various combinations of binary 1 and binary 0 states, comparator 20 may be biased to favor one binary state or the other at any particular time. Thus, if all of the $N+1$ slave stations are simultaneously transmitting a random one of either a binary 1 or a binary 0 at the beginning of their messages, both the symbol 0 detector means output 16b and the symbol 1 detector means output 18b may be enabled, as will both comparator inputs 20a and 20b. Comparator 20 will, however, provide only one of the two possible binary states at its output 20c. Output 20c may be biased, as at an input 20d, to favor one of the binary state at all times, or to favor alternate ones of the binary states at different times, dependent upon the desired system characteristics.

Regardless of the binary state provided at comparator output 20c, this binary state is retransmitted during the response portion of the same bit time interval, from master station 11 to all of the now-receiving slave stations 12. At least one of the slave stations will receive the binary state transmitted during the response portion as an echo of the binary state that slave station transmitted during the initial portion of that same bit time interval. Other slave stations will receive the echoed bit and, upon comparison with the bit previously transmitted, may find that the echoed bit is different from the previously transmitted bit; slave stations making such unfavorable comparison will identify a collision and stop transmitting until the channel is sensed to be clear (by lack of reception of a master station transmission during both the initial and response portions of a subsequent bit time interval).

During the next bit time interval, e.g. time interval $T_2$, only those slave stations which had previously received a proper echo during the first bit time interval $T_1$ will transmit, during the initial portion of interval $T_2$, the next bit of message data. Detection of that bit at master station 11 provides another binary state at comparator output 20c, which binary state is echoed during the response portion of interval $T_2$. All of the (still-transmitting) slave stations listen to the $T_2$ interval response portion echo and either cease further transmission if the echoed bit is different from the transmitted bit, or prepare to transmit the third bit of their message if the echoed bit is identical to the second transmitted bit. Thus, at the beginning of third synchronized bit time interval $T_3$, only those slave stations which have transmitted both the first and second message bits as echoed from the master station, transmit their third message bit in the initial portion of interval $T_3$. During the response portion of interval $T_3$, master station 11 echoes the binary state then appearing at comparator output 20c. Again, one or more of the contending slave stations may find a discrepancy between the transmitted third bit and the echoed third bit, and will cease further transmission. Only those stations having transmitted all three of the echoed bits will continue transmitting the fourth bit, during time interval $T_4$. Similarly, in the response portion of time interval $T_4$, other slave stations will cease transmission, having failed to receive an echo of the fourth data bit of their transmission; at least one slave station will receive the proper echo and then transmit the fifth data bit of its message in time interval $T_5$. Thus, it will be seen that after a limited number of bit time intervals T, only one of the slave stations 12 will have received the correct echoed sequence for each and every data bit of its message, and only that slave station will continue to send the remainder of its message. The intial portions of the data communication from that slave station need not be repeated, as that initial message portion (defined as the portion necessary to resolve all contending slave stations down to a single slavbe station) is already known to the master station, as evidenced by the echoing back, on a bit-by-bit basis, of that initial message portion. Each of the slave stations may store the echoed bits, and thus have the entire message available in storage, should that message be addressed to a slave station; this obviates the need for another transmission of the message from master station 11. Therefore, our novel technique does not require that the message of the single station finally securing sole access to the bus be in any way repeated; no system time is thus lost.

Figure 3:
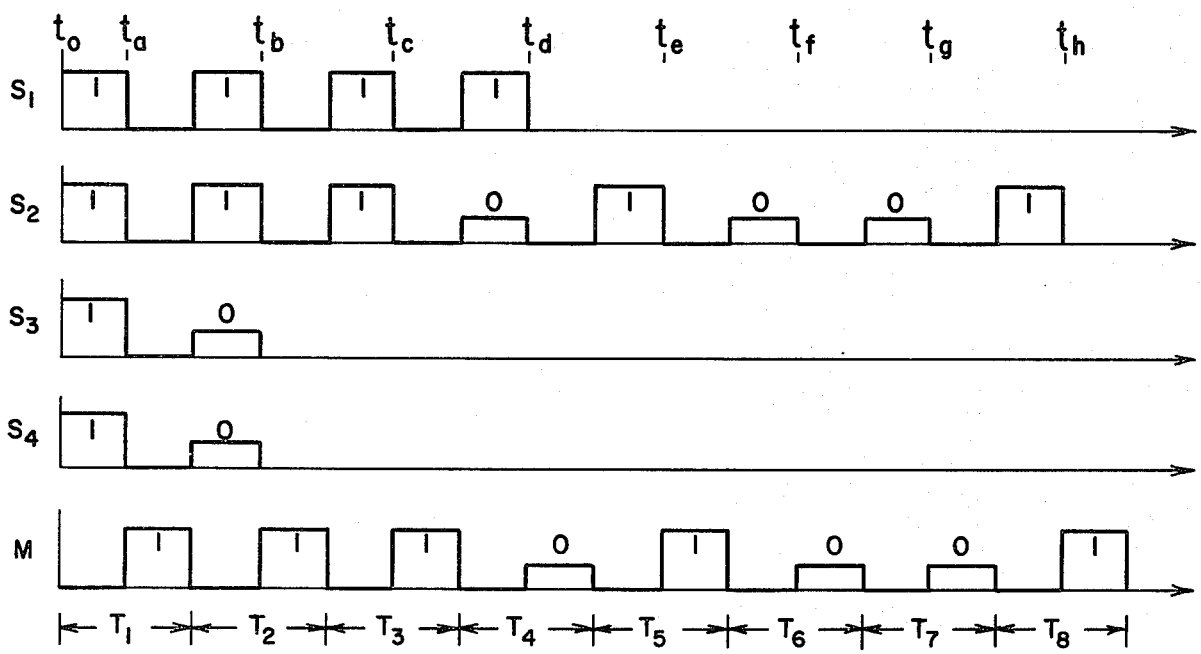
FIG. 3 is a set of coordinated graphs illustrating operation of the present invention in a system in which four slave stations commence transmission of a message simultaneously.

An example of the foregoing master-quiet, slaved-stations-in-contention portion of our method is illustrated for four contending slave stations $S_1$–$S_4$, in FIG. 3. Common bus 14 having been quiet for some predetermined time interval, the four slave stations $S_1$–$S_4$ all commence transmission of the first bit of each of their messages during the initial portion (from time $t_0$ to time $t_a$) of first time interval $T_1$. As will be seen, each of the four messages begins with a binary 1 bit. Since the received signal at main station input 11a is totally of a single binary state, e.g. the binary 1 state, only the symbol "1" detector means output 18b is enabled, whereby comparator output 20c is enabled to the binary 1 state. The slave stations all cease transmission at time $t_a$, whereupon the master station M retransmits the echoing binary 1 data bit in the response portion of first time interval $T_1$. As all four of the slave stations receive the proper echo during the first time interval response period, all four of the slave stations enter the second time interval $T_2$ in the active condition and transmit their respective second bit binary states.

In the second bit time interval $T_2$ initial period the first and second slave stations $S_1$ and $S_2$ each transmit a binary 1 bit, while the third and fourth stations $S_3$ and $S_4$ each transmit a binary 0 bit. Since the received signal at the main station input is not predominantly either a binary 1 or a binary 0 signal, the composite binary 1 and binary 0 symbols are both detected and both detector output 16b and 18b are enabled. Dependent upon the then-present bias of comparator 20, one of the binary states, e.g. a binary 1 state, is provided at comparator output 20c. In the response portion of the second bit time interval, commencing at time $t_b$, the main station M echoes this binary 1 bit to all slaved stations on the bus. Stations $S_3$ and $S_4$ thus receive the opposite binary state from that transmitted, detect a collision and cease further transmission. Stations $S_1$ and $S_2$ detect the proper echoed binary state and prepare to transmit the third bit of their respective messages in the next bit time interval $T_3$.

As will be seen in the third bit time interval, both first and second slave stations $S_1$ and $S_2$ transmit the same binary state, e.g. a binary 1 condition, which is echoed back, in the third bit time interval response portion starting at $T_c$, as a master station M binary 1 condition. Thus, both $S_1$ and $S_2$ prepare to send the fourth bit of their respective messages. In the initial portion of time interval $T_4$, first slave station $S_1$ transmits a binary 1 state, while second slave station $S_2$ transmits a binary 0 state. As the received signal at the master station is a composite of the binary 1 and binary 0 states, the comparator bias determines the binary state at comparator output 20c. Illustratively, the bias on comparator input 20d is now such that the binary 0 state is favored, whereby in the response period of time interval $T_4$, starting at time $t_d$, master station M echoes a binary 0 state. Upon receipt of this echo transmission, a discrepancy is noted in station $S_1$ and that station ceases transmission. Only slave station $S_2$ is now enabled for further message bit transmissions. Thus, in time intervals $T_5$-$T_8$ (illustratively the remaining time intervals necessary for transmission of an illustrative eight-bit message), the sole transmitting slave station $S_2$ respectively transmits binary 1, binary 0, binary 0 and binary 1 states, which are respectively echoed, at time $t_e$, $t_f$, $t_g$ and $t_h$, as binary 1, binary 0, binary 0 and binary 1 states. Thus it will be seen that no portion of the $S_2$ message need be repeated, yet the entire 11101001 eight-bit message was successfully received and echoed back from master station M.

In the condition where the master station 11 initiates a message, the message utilizes initial flag bits to identify the source. In one embodiment, each bit of the message is transmitted during an initial portion of a bit time interval. As the master station will then not transmit any signal, echoed or otherwise, during the response portion of each bit time interval, any slave station which commences transmission simultaneously with the master station will stop transmitting as the first data bit is not echoed back. Thus, except for a master-initiated message, the master station transmits only during the echo response period and the slaves transmit only during the initial period, while during a master-initiated message, the master transmits during the initial portion and no action is taken by master or slaves during the response portion of the bit time interval.

In another embodiment, the master station 11 transmits each bit of its message in the response portion of the associated bit time interval. All station receivers now are operative only during the response period. If none of the slaved stations are tranmitting during that first bit time interval of a master-station-originated message, the reception of a bit in the response portion of that first bit time interval informs the slaved stations that the master station has taken control of the bus. If one or more slaved stations should be transmitting simultaneously with the master station, each master station bit might be considered as an "echo". If the echoed bit is different from the slaved-station-transmitted bit, the slaved station ceases transmission; if the echoed bit is identical, the slaved station continues to transmit until the first-occuring of: either a master-station-originated bit is different from the slaved station bit (normal contention shut down of slaved station); or slaved station reception of the complete, preassigned flag bit sequence designating a master-station-originated message (which sequence is recognized by the slaved station and causes that station to cease transmission). In all cases, the master station transmission need not be repeated, as all slaved station receivers were operative during the response period, when master station data was sent, and have stored those data bits.

While this method reduces the system data rate to about one-half of what the data rate could be without any contention error coding and acknowledgement, the lack of necessity for retransmitting an initial portion of the message originated by that slave station eventually capturing the network after a contention thereon, will appreciably increase the overall system data transfer rate, and do so in a highly unambiguous manner. It should be understood that the echoed bit may be provided substantially simultaneously from the master station, utilizing another set of binary conditions, e.g. a pair of frequency-shift-keyed carriers being used for acknowledgement, which are different from the pair of frequency-shift-keyed carriers utilized for transfer of the information from slave to master. However, this full-duplex form of the system requires additional equipment and causes a deterioration of signal-to-noise ratio, as the additional signals will appear as noise to the main data transfer channels, even though the data bit rate may be approximately doubled.

While a presently preferred embodiment of our novel method has been described with some particularity herein, many variations and modifications will now become apparent to those skilled in the art. It is our intent, therefore, to be limited only by the scope of the appending claims and not by the particular instrumentalities detailed herein by way of explanation.

What is claimed is:

1. A method for arbitration of contended digital data communications in a system having a master data station and a plurality of slaved data stations interconnected by a single common data transmission medium, with each data station being capable of transmitting and receiving data via the single common medium, comprising the steps of:

(a) transmitting from at least two random ones of the plurality of slaved stations and only over the common medium, a bit of a binary data message during an initial portion of a bit time interval;

(b) simultaneously detecting at the master station either of the binary states transmitted by any of the transmitting slaved stations during the initial portion of the bit time interval;

(c) selecting one of the received binary states;

(d) transmitting only over the common medium from the master station to all of the plurality of slaved stations during a response portion, subsequent to the initial portion, of the bit time interval, an echo of the binary state selected in step (c);

(e) causing each of the previously-transmitting slaved stations not receiving an echo of the binary state previously-transmitted by that slaved station to cease furher transmission of its present message;

(f) allowing only those of the previously-transmitting slaved stations receiving an echo of the binary state transmitted by that slaved station in the initial portion of that bit time interval to transmit in an initial portion of a nextsubsequent bit time interval the binary state of a nextsubsequent bit of the present message at that allowed slaved station; and (g) repeating steps (a) through (f) until only one slaved station is transmitting.

2. The method of claim 1, further including the step of: providing all of the data stations with a capacity to continuously receive data from said common medium.

3. The method of claim 2, further comprising the step of: storing at each station each bit of data as received by that station.

4. The method of claims 1, 2 or 3 further comprising the steps of: transmitting each bit of data originating at the master station during the initial portion of a bit time interval; and disabling transmission capability of the master station during the remainder of each bit time interval during which a master station-originated data bit was transmitted.

5. The method of claim 4, further comprising the step of: preventing each slaved station from transmitting until the common medium has been devoid of transmissions thereon for a predetermined number of bit time intervals.

6. The method of claim 1, further including the step of: providing all of the data stations with a data bit reception capability only during the response portion of each bit time interval.

7. The method of claim 6, further comprising the step of: storing at each data station the data bits received by that station during the response periods.

8. The method of claims 1, 6 or 7, further comprising the steps of: tranmitting each bit of data originating at the master station during the response portion of a bit time interval.

9. The method of claim 8, further comprising the step of: transmitting a preassigned sequence of at least one flag bit at the beginning of each master-station-originated message; and causing all slaved stations to cease transmissions upon reception thereat of the preassigned sequence.

10. The method of claim 1, further comprising the step of: transmitting a preassigned sequence of at least one flag bit at the beginning of each master station-originated message; and causing all slaved stations to cease transmissions upon reception thereat of the preassigned sequence.

11. The method of claim 1, wherein step (c) includes the step of: biasing the selection process to favor one of the data states.

12. The method of claim 11, further including the step of: varying the favored data state bias on a predetermined basis.

13. The method of claim 1, further including the step of: establishing the bit time interval in synchronism for all of the master and slaved stations attached to the medium.

14. The method of claim 13, wherein the medium is a powerline and the bit time intervals are synchronized by the zero crossings of the powerline waveform.

15. The method of claim 1, wherein data transmission is accomplished by a frequency-shift-keying technique.

16. The method of claim 1, including the step of configuring the system for full-duplex operation.

* * * * *